(12) United States Patent
An et al.

(10) Patent No.: US 12,126,915 B2
(45) Date of Patent: Oct. 22, 2024

(54) ELECTRONIC DEVICE FOR PROCESSING IMAGE DATA AND IMAGE DATA PROCESSING METHOD USING SOLUTION LAYER

(71) Applicant: Samsung Electronics Co., Ltd., Suwon-si (KR)

(72) Inventors: Gyushik An, Suwon-si (KR); Joonho Youn, Suwon-si (KR); Jaehyun Kim, Suwon-si (KR); Jehan Yoon, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 17/861,814

(22) Filed: Jul. 11, 2022

(65) Prior Publication Data

US 2022/0345625 A1 Oct. 27, 2022

Related U.S. Application Data

(63) Continuation of application No. PCT/KR2021/000529, filed on Jan. 14, 2021.

(30) Foreign Application Priority Data

Jan. 15, 2020 (KR) ........................ 10-2020-0005611

(51) Int. Cl.
*H04N 21/262* (2011.01)
*H04N 5/77* (2006.01)
*H04N 23/80* (2023.01)

(52) U.S. Cl.
CPC ............... *H04N 23/80* (2023.01); *H04N 5/77* (2013.01)

(58) Field of Classification Search
CPC .......... H04N 23/80; H04N 5/77; H04N 5/772; H04N 21/262; H04N 23/60; H04N 21/26291
See application file for complete search history.

(56) References Cited

U.S. PATENT DOCUMENTS

| 8,553,152 B2 | 10/2013 | Yoon |
| 8,812,051 B2 | 8/2014 | Jouin |
| 8,863,191 B2 | 10/2014 | Choi et al. |
| 9,554,084 B2 | 1/2017 | Lee et al. |

(Continued)

FOREIGN PATENT DOCUMENTS

| EP | 2 599 325 B1 | 4/2019 |
| KR | 10-2012-0089980 A | 8/2012 |

(Continued)

*Primary Examiner* — Mekonnen D Dagnew
(74) *Attorney, Agent, or Firm* — Jefferson IP Law, LLP

(57) ABSTRACT

An electronic device is provided. The electronic device includes a camera module for acquiring image data, a memory for storing a program module for controlling the camera module, and a processor electrically connected to the camera module or the memory, wherein the program module includes an application associated with the camera module, a framework for processing one or more requests received by the application, a hardware interface for interfacing with the camera module, and a solution layer for interlinking the hardware interface and the framework, and performing a post-processing operation of the image data by using at least a part of the camera module.

15 Claims, 13 Drawing Sheets

(56) References Cited

U.S. PATENT DOCUMENTS

| | | |
|---|---|---|
| 9,946,505 B2 | 4/2018 | Becze et al. |
| 10,740,058 B2 | 8/2020 | Sirpal et al. |
| 11,327,526 B2 | 5/2022 | Reeves et al. |
| 2012/0019721 A1 | 1/2012 | Choi et al. |
| 2012/0176546 A1 | 7/2012 | Yoon |
| 2015/0189322 A1 | 7/2015 | He et al. |
| 2015/0293575 A1* | 10/2015 | Hampson ............... G06F 1/329 |
| | | 713/323 |
| 2016/0269677 A1 | 9/2016 | Lee et al. |
| 2019/0087198 A1* | 3/2019 | Frascati ............... G06F 9/3017 |
| 2019/0166306 A1* | 5/2019 | Zen ....................... H04N 25/53 |
| 2019/0187947 A1 | 6/2019 | Sirpal et al. |

FOREIGN PATENT DOCUMENTS

| | | |
|---|---|---|
| KR | 10-1586321 B1 | 1/2016 |
| KR | 10-2016-0104678 A | 9/2016 |
| KR | 10-2020-0094436 A | 8/2020 |

* cited by examiner

ELECTRONIC DEVICE FOR PROCESSING IMAGE DATA AND IMAGE DATA PROCESSING METHOD USING SOLUTION LAYER

CROSS-REFERENCE TO RELATED APPLICATION(S)

This application is a continuation application, claiming priority under § 365(c), of an International application No. PCT/KR2021/000529, filed on Jan. 14, 2021, which is based on and claims the benefit of a Korean patent application number 10-2020-0005611, filed on Jan. 15, 2020, in the Korean Intellectual Property Office, the disclosure of which is incorporated by reference herein in its entirety.

BACKGROUND

1. Field

The disclosure relates to an electronic device for processing image data and an image data processing method. More particularly, the disclosure relates to an electronic device for processing image data and including a camera module that obtains image data, a memory storing a program module that controls the camera module, and a processor electrically connected with the camera module and the memory.

2. Description of Related Art

With the development of technology, there has been an increase in electronic devices (or image capture devices) (e.g., cameras, smartphones, and tablet personal computers (PCs)) to which various image processing solutions are applied. When the image processing solutions are applied, an image processing time may increase to improve the quality of an image.

A hardware abstract layer (HAL) which abstracts a hardware resource, such as an image sensor, an image signal processor (ISP), a scaler, or an encoder and makes a changed hardware resource available without a code change task even when the hardware resource is changed is applied as an image processing scheme. In general, a life cycle of the HAL may be determined according to an operation sequence of an application or a framework which is located on an upper layer.

The above information is presented as background information only to assist with an understanding of the disclosure. No determination has been made, and no assertion is made, as to whether any of the above might be applicable as prior art with regard to the disclosure.

SUMMARY

An HAL of an existing electronic device (e.g., a camera device, a smartphone, or a tablet PC) varies in implementation method with a chipset vendor which manufactures chipsets. Thus, an electronic device vendor using several chipsets should perform respective tasks to fit HALs of several chipset vendors when implementing the same function in conjunction with image processing. Thus, many development resources are consumed.

The HAL of the existing electronic device may be configured to follow a life cycle of an application or a framework. Thus, even when it takes a lot of time to process a solution for image quality improvement in the HAL, because the HAL is ended when the life cycle of the application or the framework is ended, there is a problem in which a user may not obtain an image of improved image quality.

Aspects of the disclosure are to address at least the above-mentioned problems and/or disadvantages and to provide at least the advantages described below. Accordingly, an aspect of the disclosure is to provide an electronic device for processing image data and an image data processing method.

Additional aspects will be set forth in part in the description which follows and, in part, will be apparent from the description, or may be learned by practice of the presented embodiments.

In accordance with an aspect of the disclosure, an electronic device is provided. The electronic device includes a camera module that obtains image data, a memory storing a program module that controls the camera module, and a processor electrically connected with the camera module and the memory. The program module includes an application associated with the camera module, a framework that processes one or more requests received from the application, a hardware interface that performs interface with the camera module, and a solution layer that links between the hardware interface and the framework and performs a post processing operation of the image data using at least a part of the camera module.

The electronic device according to various embodiments disclosed in the disclosure may reduce development costs of electronic device vendors which use various chipsets associated with image processing, using an abstracted layer which communizes HALs (or hardware interfaces) of several chipset vendors.

The electronic device according to various embodiments disclosed in the disclosure may manage a life cycle of the abstracted layer which communizes the HALs independently of an application or a framework. As a result, when a sudden interrupt occurs (e.g., when a call is received or when an alarm occurs), the electronic device may store an image of improved image quality using a hardware resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents it includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
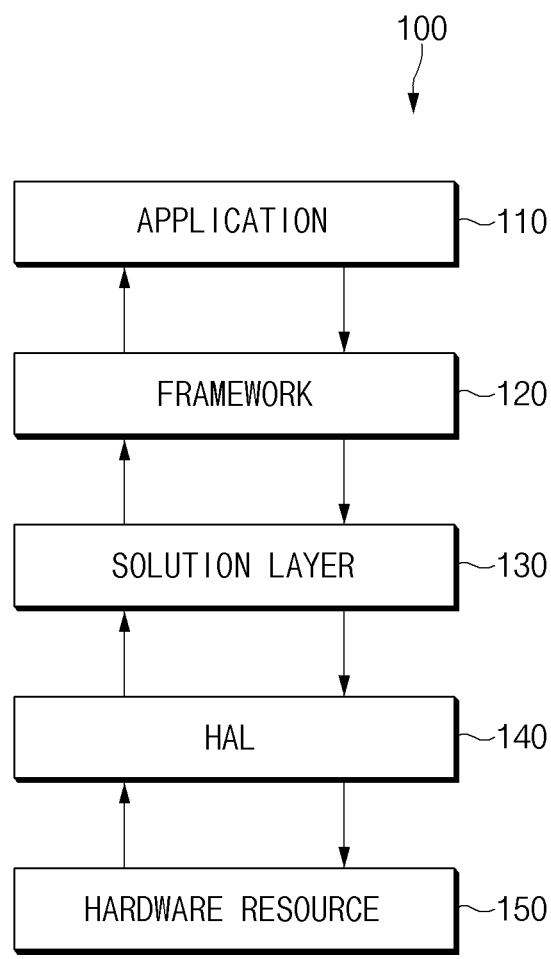
FIG. 1 is a block diagram of a program module for image processing according to an embodiment of the disclosure.

FIG. 1 is a block diagram of a program module for image processing according to an embodiment of the disclosure.

Referring to FIG. 1, a program module 100 may be stored in a memory of an electronic device and may include an application (or an application layer) 110, a framework 120, a solution layer 130, an HAL 140, and a hardware resource 150.

The application (or the application layer) 110 may be an application associated with image processing. For example, the application 110 may be a camera app or a photo edit app.

According to various embodiments of the disclosure, the application 110 may have a specified life cycle. For example, the application 110 may have a life cycle including an open state for turning on a camera module and generating a software (SW) instance, a stream configuration state for determining a streams, such as preview or recording and allocating a related buffer, a running state for receiving a request from the application and the framework and transmitting a result, a flush state for removing or ignoring a remaining request which is not currently processed upon termination, or a close state for releasing the SW instance and turning off the camera module.

When entering the open state depending on the life cycle, the application 110 may transmit a request signal associated with image processing to the framework 120 using a specified interface (e.g., an Android standard interface). The application 110 may receive a result signal corresponding to the request signal from the framework 120.

The framework 120 may process one or more task requests received from the application 110. The framework 120 may provide, for example, a function the application 110 needs, or may provide various functions such that the application 110 may efficiently use a system resource.

According to an embodiment of the disclosure, the framework 120 may have a specified life cycle. The life cycle of the framework 120 may be the same as the life cycle of the application 110.

The framework 120 may receive the request signal associated with the image processing from the application 110. The framework 120 may load a library of the solution layer 130 without loading a library of the HAL 140. As a result, the framework 120 may transmit and receive a signal with the solution layer 130 using the specified interface (e.g., the Android standard interface) and may fail to transmit and receive a direct signal with the HAL 140. The framework 120 may receive a result signal from the solution layer 130 and may deliver the result signal to the application 110.

The solution layer 130 may be present between the framework 120 and the HAL 140 and may link the framework 120 and the HAL 140 using the specified interface (e.g., the Android standard interface). The solution layer 130 may receive image data through the HAL 140 and may apply a solution of a specified scheme about image processing. When it is necessary to process image data using the hardware resource 150, the solution layer 130 may request the HAL 140 to process the image data and may receive a result.

According to an embodiment of the disclosure, the solution layer 130 may have a life cycle different from the application 110 or the framework 120. When receiving a signal (hereinafter, a close request signal) requesting to return the hardware resource 150 and end the HAL 140 from the framework 120 and when it is determined that there is a need for post processing of image data, the solution layer 130 may fail to proceed with returning the hardware resource 150 and ending the HAL 140 (refer to FIGS. 2, 3A, 3B, 3C, and 4 to 9).

According to various embodiments of the disclosure, the solution layer 130 may have the same library name as the existing HAL 140 to open the solution layer 130, without correcting the framework 120.

The HAL (or hardware interface) 140 may be present between the solution layer 130 and the hardware resource 150. The HAL 140 may communicate with the solution layer 130 in a specified communication scheme (e.g., the Android standard interface). According to an embodiment of the disclosure, the HAL 140 may communicate with a kernel using I/O control (ioctl) or the like to access the hardware resource 150.

The hardware resource 150 may be a set of hardware blocks associated with image processing, for example, an image sensor, an image processing unit, and a scaler. The hardware resource 150 may obtain image data by means of an image sensor and may convert the obtained image data.

Hereinafter, a description will be given of the operation of the solution layer 130, which is about using the hardware resource 150 associated with image processing, but not limited thereto. The solution layer 130 may also be applied to a hardware module which is unable to always be turned on because of using many hardware resources (a memory, power, a central processing unit (CPU), and the like).

Figure 2:
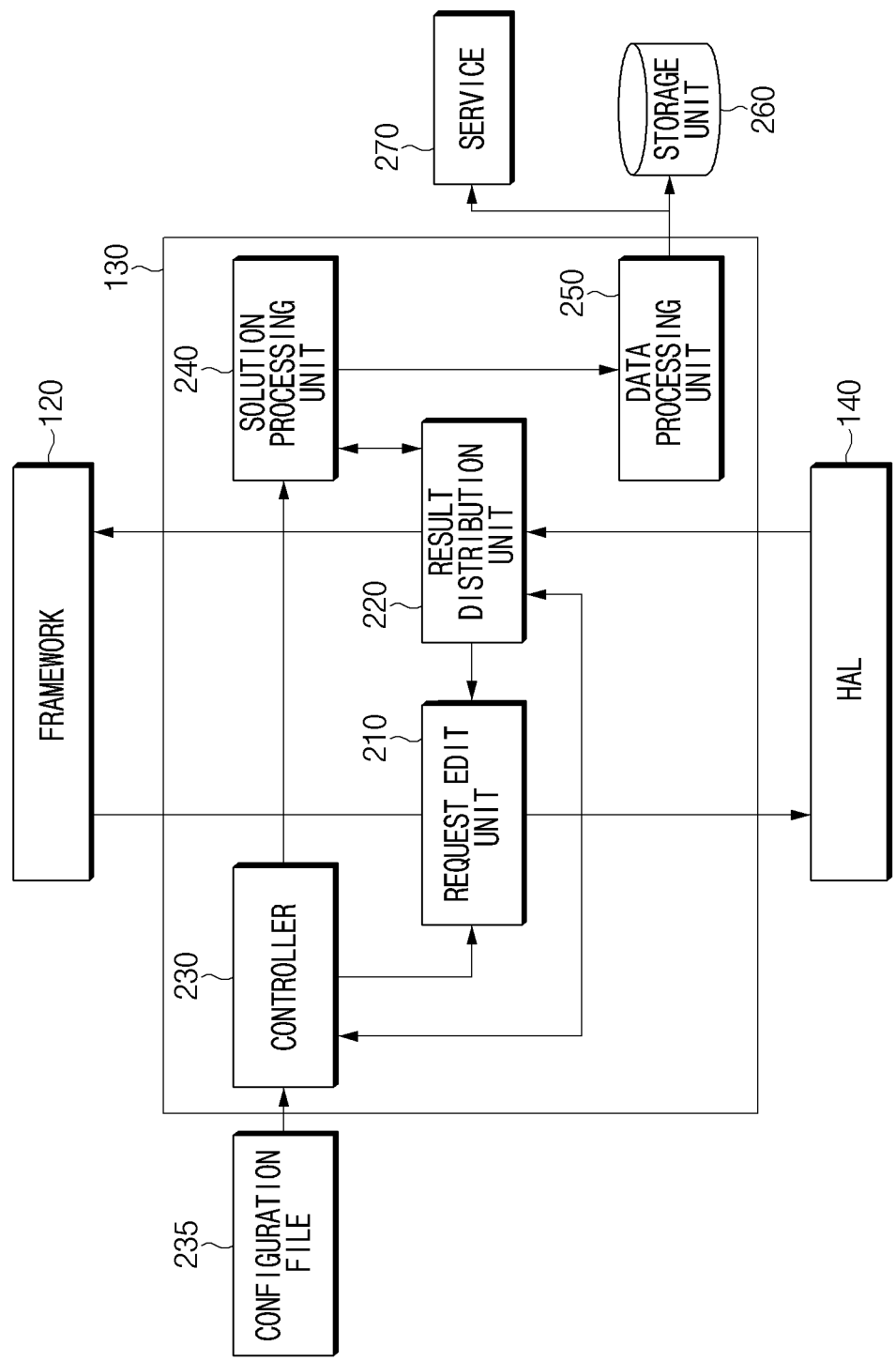
FIG. 2 is a block diagram of a solution layer according to an embodiment of the disclosure.

FIG. 2 is a block diagram of a solution layer according to an embodiment of the disclosure. FIG. 2 is illustrative, but not limited thereto.

Referring to FIG. 2, a solution layer 130 may include a request edit unit 210, a result distribution unit 220, a controller 230, a solution processing unit 240, and a data processing unit 250.

The request edit unit 210 may receive a signal (hereinafter, a first request signal) requesting to use a hardware resource 150 associated with image processing from a framework 120 and may change the first request signal to an internal request signal (hereinafter, a second request signal). The request edit unit 210 may transmit the second request signal to an HAL 140. Because there is a 1:N relationship between the framework 120 and the HAL 140, the first request signal of the framework 120 and the second request signal generated by the request edit unit 210 may be different from each other. The request edit unit 210 may function as managing the first request signal of the framework 120 and the internally generated second request signal.

The result distribution unit 220 may manage a result signal (or a response signal) received from the HAL 140 in response to the second request signal and may transmit the result signal (or the response signal) to the framework 120. The result distribution unit 220 may function as determining whether there is a result signal corresponding to a certain request signal of the framework 120.

The result distribution unit 220 may request the controller 230 to determine whether reprocessing a first result signal transmitted from the HAL 140 using the hardware resource 150. When the reprocessing is needed using the hardware resource 150, the result distribution unit 220 may request the request edit unit 210 to transmit a separate request signal for reprocessing to the HAL 140.

According to an embodiment of the disclosure, the controller 230 may control solutions for image quality improvement, which are performed in the solution layer 130, based on contents described in a configuration file (e.g., config file) 235.

According to an embodiment of the disclosure, the controller 230 may control a life cycle of the solution layer 130. The controller 230 may determine whether the solutions for image quality improvement need to reuse the hardware resource 150. When the solutions for image quality improvement need to reuse the hardware resource 150, the solution layer 130 may be continuously maintained without being ended. Alternatively, when the solutions for image quality improvement does not need to use the hardware resource 150, the solution layer 130 may be ended according to a close request signal delivered from the framework 120.

The configuration file (e.g., the config file) 235 may include contents necessary for operation of the solution layer 130 and operation of a solution associated with image processing.

The solution processing unit 240 may process image data by sequentially applying specified solutions to the image data, based on a control signal about applying the solution, which is received from the controller 230. The solution processing unit 240 may deliver the processed result to the result distribution unit 220. The result distribution unit 220 may deliver the processed result to the framework 120.

In a state where solution processing for image data is not ended, when a connection with the framework 120 is disconnected as an application 110 is ended, the data processing unit 250 may store a result of the solution for image quality improvement in a storage unit 260 or may deliver the result to another service 270.

When the result of the solution layer 130 is not delivered to the application 110 through the framework 120, the storage unit 260 may temporarily store a result to which the solution for image quality improvement is applied.

The service 270 may serve to receive a result generated after the connection between the solution layer 130 and the framework 120 is disconnected from the solution layer 130 and store the result in a gallery.

Figure 3A:
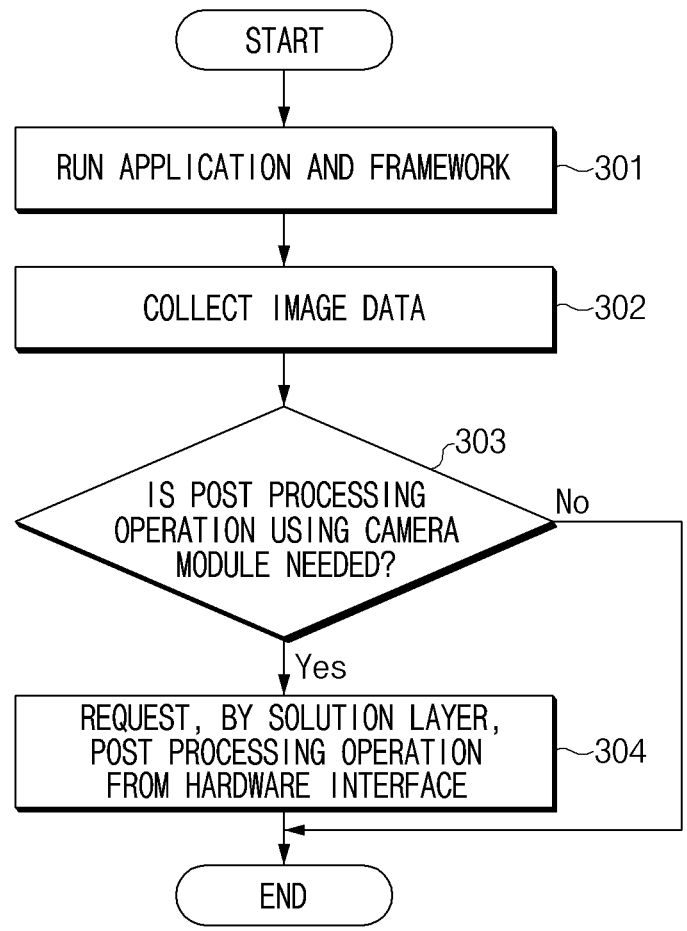
FIG. 3A is a flowchart illustrating an image processing method according to an embodiment of the disclosure.

FIG. 3A is a flowchart illustrating an image processing method according to an embodiment of the disclosure.

Referring to FIG. 3A, in operation 301, a processor of an electronic device may run an application 110 associated with a camera module and a framework 120. For example, the application 110 may be a camera app or a photo edit app. The framework 120 may provide a function the application 110 needs, or may provide various functions such that the application 110 may efficiently use a system resource. A life cycle of the framework 120 may be the same as a life cycle of the application 110.

In operation 302, the processor may obtain image data using the camera module (e.g., a hardware resource 150 of FIG. 1). The camera module may be a set of hardware blocks associated with image processing, for example, an image sensor, an image processing unit, and a scaler.

In operation 303, the processor may determine whether the obtained image data needs a post processing operation using the camera module (e.g., the hardware resource 150 of FIG. 1), by means of a solution layer 130 which links between the framework 120 and a hardware interface (e.g., an HAL 140 of FIG. 1) of the camera module (e.g., the hardware resource 150 of FIG. 1).

When the post processing operation using the camera module (e.g., the hardware resource 150 of FIG. 1) is needed, in operation 304, the processor may control the solution layer 130 to request the post processing operation using the camera module (e.g., the hardware resource 150 of FIG. 1) from the hardware interface (e.g., the HAL 140 of FIG. 1).

Figure 3B:
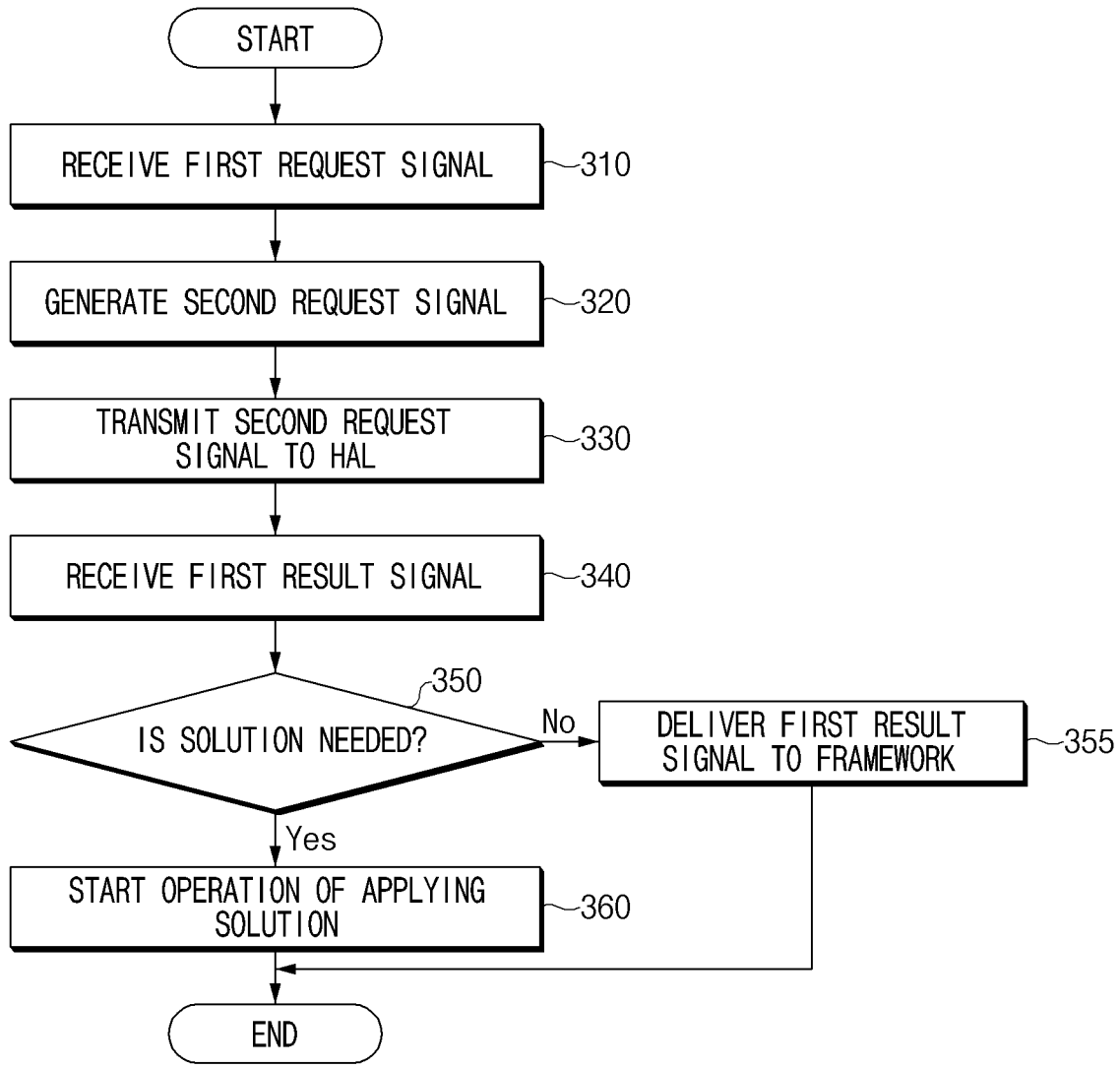
FIG. 3B is a flowchart illustrating an image processing method in a solution layer according to an embodiment of the disclosure.

FIG. 3B is a flowchart illustrating an image processing method in a solution layer according to an embodiment of the disclosure.

Referring to FIG. 3B, in operation 310, a solution layer 130 may receive a first request signal from a framework 120. The first request signal may be a signal requesting to use a hardware resource 150 associated with image processing.

In operation 320, the solution layer 130 may generate a second request signal based on the first request signal. The second request signal may have the same format (or standard) as the first request signal. According to an embodiment of the disclosure, a request edit unit 210 of the solution layer 130 may identify the number of second request signals which should be generated by means of the controller 230.

In operation 330, the solution layer 130 may transmit the second request signal to an HAL 140. The HAL 140 may drive a hardware resource 150, based on the second request signal (e.g., a process capture request (PCR)).

In operation 340, the solution layer 130 may receive a first result signal corresponding to the second request signal from the HAL 140.

In operation 350, the solution layer 130 may identify whether the first result signal needs to apply a solution using the hardware resource 150. A result distribution unit 220 of the solution layer 130 may request the controller 230 to determine whether the first result signal transmitted from the HAL 140 needs to be reprocessed using the hardware resource 150. The controller 230 may determine whether a solution for image quality improvement, which is performed by the solution layer 130, should be applied, based on contents described in a configuration file (e.g., a config file) 235.

When the solution using the hardware resource 150 does not need to be applied, in operation 355, the first result signal may be delivered to a framework 120.

When the solution using the hardware resource 150 needs to be applied, in operation 360, the solution layer 130 may transmit a third request signal to the HAL 140 and may start an operation of applying the solution. When reprocessing is needed using the hardware resource 150, the result distribution unit 220 may request the request edit unit 210 to transmit the third request signal for reprocessing to the HAL 140.

Figure 3C:
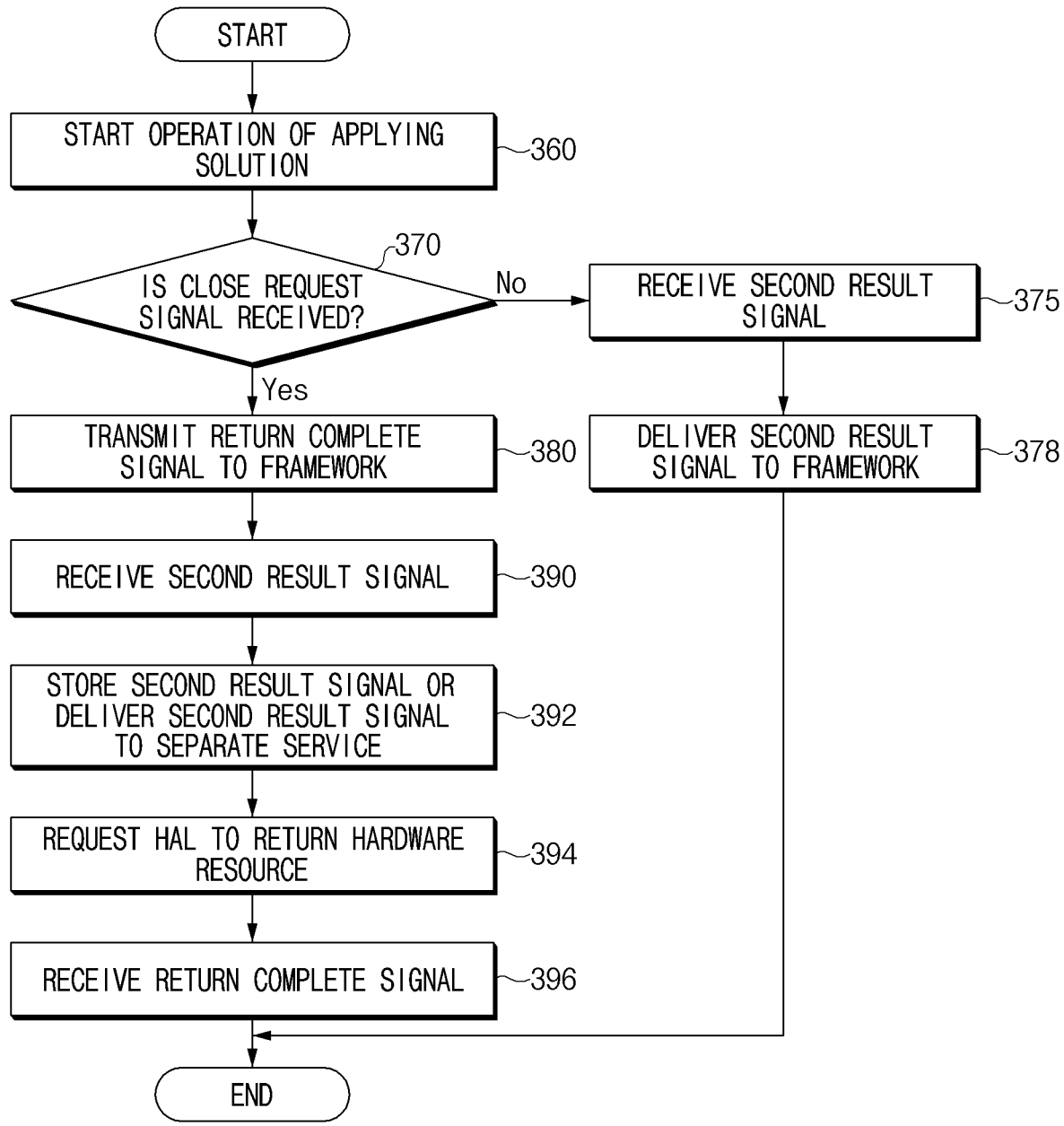
FIG. 3C is a flowchart illustrating an image processing method in a solution layer when receiving a close request signal according to an embodiment of the disclosure.

FIG. 3C is a flowchart illustrating an image processing method in a solution layer when receiving a close request signal according to an embodiment of the disclosure.

Referring to FIG. 3C, in operation 360, when a solution using a hardware resource 150 needs to be applied, a solution layer 130 may transmit a third request signal to an HAL 140 and may start an operation of applying the solution using the hardware resource 150.

In operation 370, during the operation of applying the solution, the solution layer 130 may identify whether a close request signal is received from a framework 120. When a sudden interrupt occurs (e.g., when a call is received, when an alarm occurs, or the like) during the operation of applying the solution, the solution layer 130 may receive the close request signal from the framework 120.

When there is no separate close request signal, in operation 375, the solution layer 130 may receive a second result signal in which the application of the solution using the hardware resource 150 is completed.

In operation 378, the solution layer 130 may deliver the second result signal to the framework 120.

When receiving the close request signal during the operation of applying the solution using the hardware resource 150, in operation 380, the solution layer 130 may transmit a return complete signal to the framework 120. The solution layer 130 may fail to transmit a separate close request signal to the HAL 140. The HAL 140 may continue performing a post processing operation of image data using the hardware resource 150.

In operation 390, the solution layer 130 may receive a second result signal in which the application of the solution using the hardware resource 150 is completed.

Figure 7:
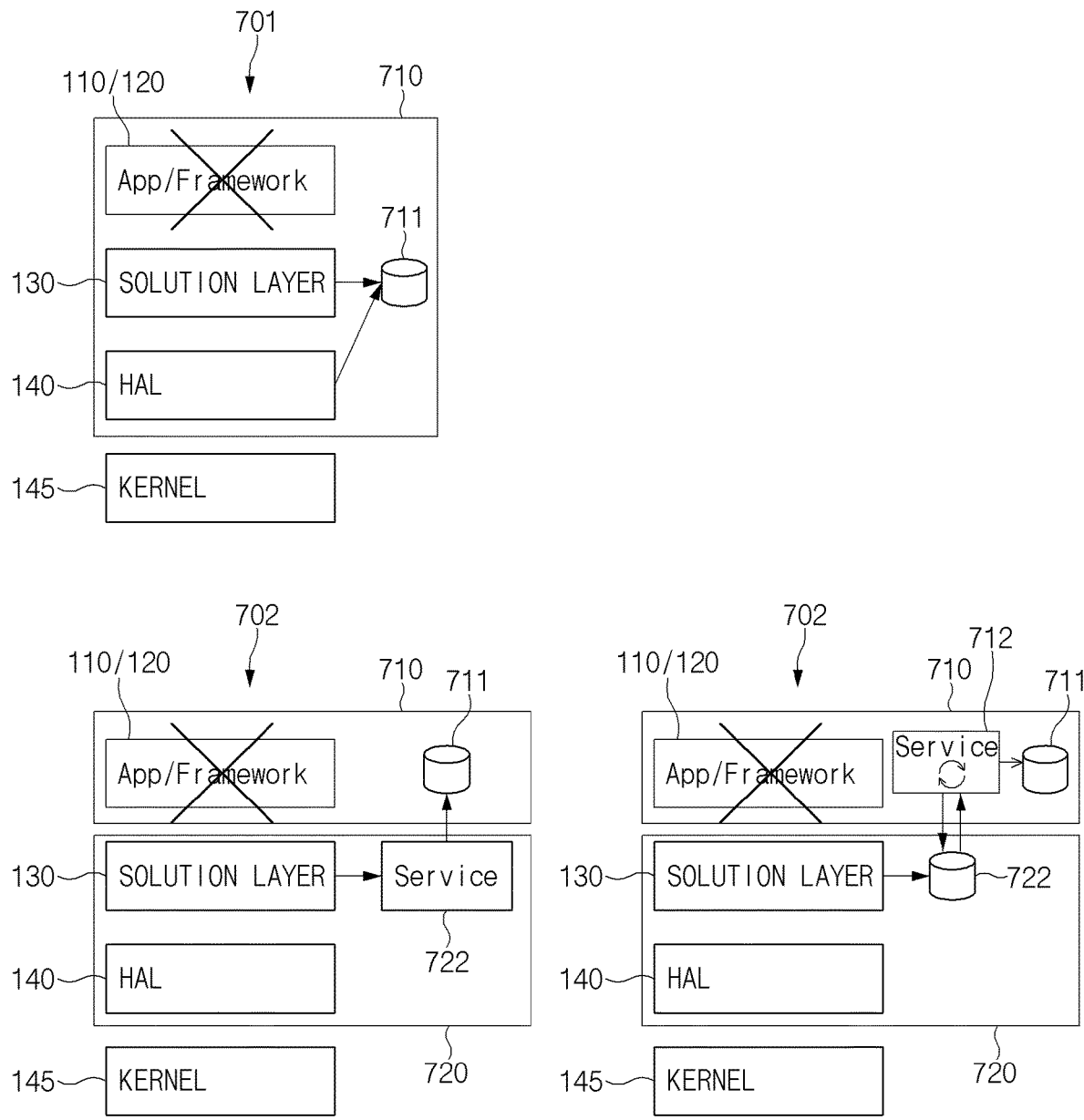
FIG. 7 is a drawing illustrating storage of a result signal according to partition division according to an embodiment of the disclosure.

In operation 392, the solution layer 130 may store the second result signal or may deliver the second result signal to a separate service (refer to FIG. 7).

In operation 394, the solution layer 130 may request the HAL 140 to return the hardware resource 150.

In operation 396, the solution layer 130 may receive the return complete signal of the hardware resource 150 from the HAL 140.

Figure 4:
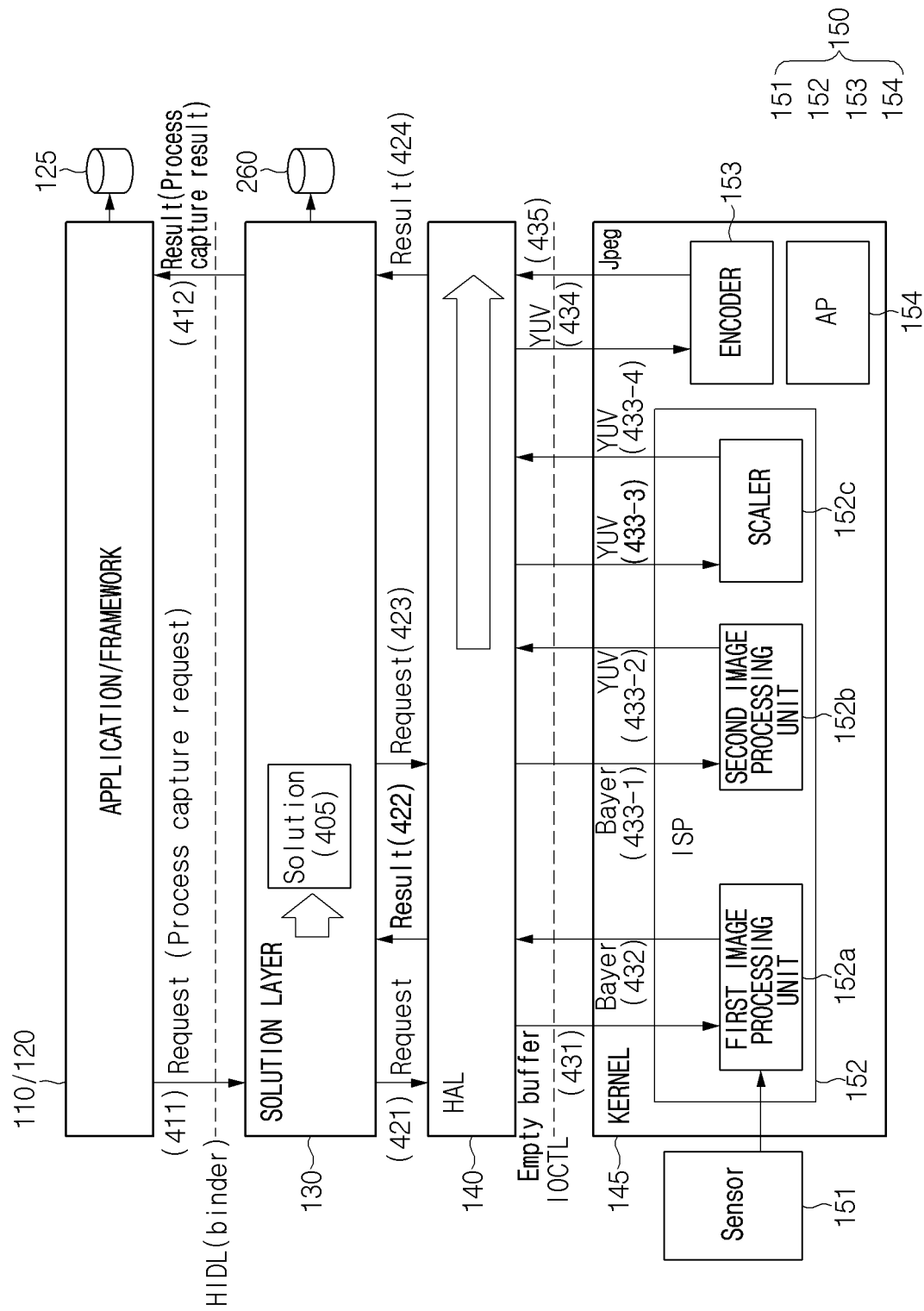
FIG. 4 is a signal flow diagram about image processing in a state where a connection between a framework and a solution layer is maintained according to an embodiment of the disclosure.

FIG. 4 is a signal flow diagram about image processing in a state where a connection between a framework and a solution layer is maintained according to an embodiment of the disclosure.

Referring to FIG. 4, an application/framework 110/120 may generate a first request signal (e.g., a process capture request (PCR)) 411 about image processing and may transmit the first request signal 411 to a solution layer 130 in a specified communication scheme (e.g., binder communication). The first request signal 411 may be generated and transmitted every frame and every capture operation.

The solution layer 130 may receive the first request signal 411 and may internally change the first request signal 411 to a new second request signal 421. The second request signal (e.g., the PCR) 421 may have the same format (or standard) as the first request signal 411. The solution layer 130 may transmit the second request signal 421 to an HAL 140.

The HAL 140 may fail to recognize whether the second request signal (e.g., the PCR) 421 is a signal delivered from the application/framework 110/120 or a signal delivered from the solution layer 130. Thus, the HAL 140 may process the second request signal (e.g., the PCR) 421, without a separate additional operation.

The HAL 140 may drive a hardware resource 150, based on the second request signal (e.g., the PCR) 421. The HAL 140 may transmit a signal 431 requesting to obtain image data through a specified communication interface, such as I/O control (ioctl) to a kernel 145 to use the hardware resource 150. The HAL 140 may receive the obtained image data (432) and may deliver the image data to the solution layer 130 (a first result signal 422). According to an embodiment of the disclosure, when the first result signal 422 does not need a solution for image quality improvement using the hardware resource 150, the solution layer 130 may deliver the first result signal 422 to the framework 120 or may store the first result signal 422 in the storage unit 260. For example, the HAL 140 may download an empty buffer to a first image processing unit (e.g., an auto exposure, auto focus, auto whitebalance (3AA) block) 152a of an image signal processor (ISP) 152 to obtain Bayer data (431). For example, the first image processing unit 152a may process Bayer data received from an image sensor 151 using a 3AA algorithm, may load the Bayer data into a corresponding buffer, and may upload the Bayer data to the HAL 140 (432). The HAL 140 may deliver the Bayer data to the solution layer 130 (422).

The solution layer 130 may apply a solution (e.g., a Bayer solution) about specified image processing based on the first result signal 422 delivered from the HAL 140.

According to various embodiments of the disclosure, the solution layer 130 may determine whether to proceed with image processing by additionally using the hardware resource 150. The solution layer 130 may refer to a configuration file (a configuration file 235 of FIG. 2) about image processing. When there is a need to additionally use the hardware resource 150, a new third request signal 423 may be transmitted to the HAL 140.

For example, the HAL 140 may transmit Bayer data to a second image processing unit 152b responsible for an image quality algorithm, in response to the third request signal 423 (433_1), and may receive the processed result in a YUV format (433-2). The HAL 140 may request a scaler 152c to change a size of image data of the YUV format, in response to the third request signal 423 (433-3). The HAL 140 may receive the image data of the YUV format, the size of which is changed, from the scaler 152c (433-4). The HAL 140 may perform image processing using the hardware resource 150 and may obtain a joint photographic experts group (JPEG) image data by means of an encoder 153 (434 and 435). The HAL 140 may transmit the JPEG image data to the solution layer 130 (a second result signal 424).

It is illustratively shown that the Bayer data is transmitted to the second image processing unit 152b in response to the third request signal 423 in FIG. 4, but not limited thereto. For example, the third request signal 423 may be a request for at least one of blocks controlled by the HAL 140, for example, the scaler 152c or the encoder 153 included in the hardware resource 150.

When the connection of the framework 120 is maintained (when the application 110 is maintained without being ended), the solution layer 130 may transmit the second result signal (e.g., the JPEG image data) to the framework 120 (412). The framework 120 may store the JPEG image data in a storage unit 125 accessible by the application/framework 110/120.

According to various embodiments of the disclosure, when the connection with the framework 120 is disconnected by the end of the application 110, the solution layer 130 may temporarily store the second result signal, the image processing of which is performed, in the storage unit 260 accessible by the solution layer 130 or may transmit the second result signal to a separate service communicable with the solution layer 130 (FIGS. 5 to 9).

Figure 5:
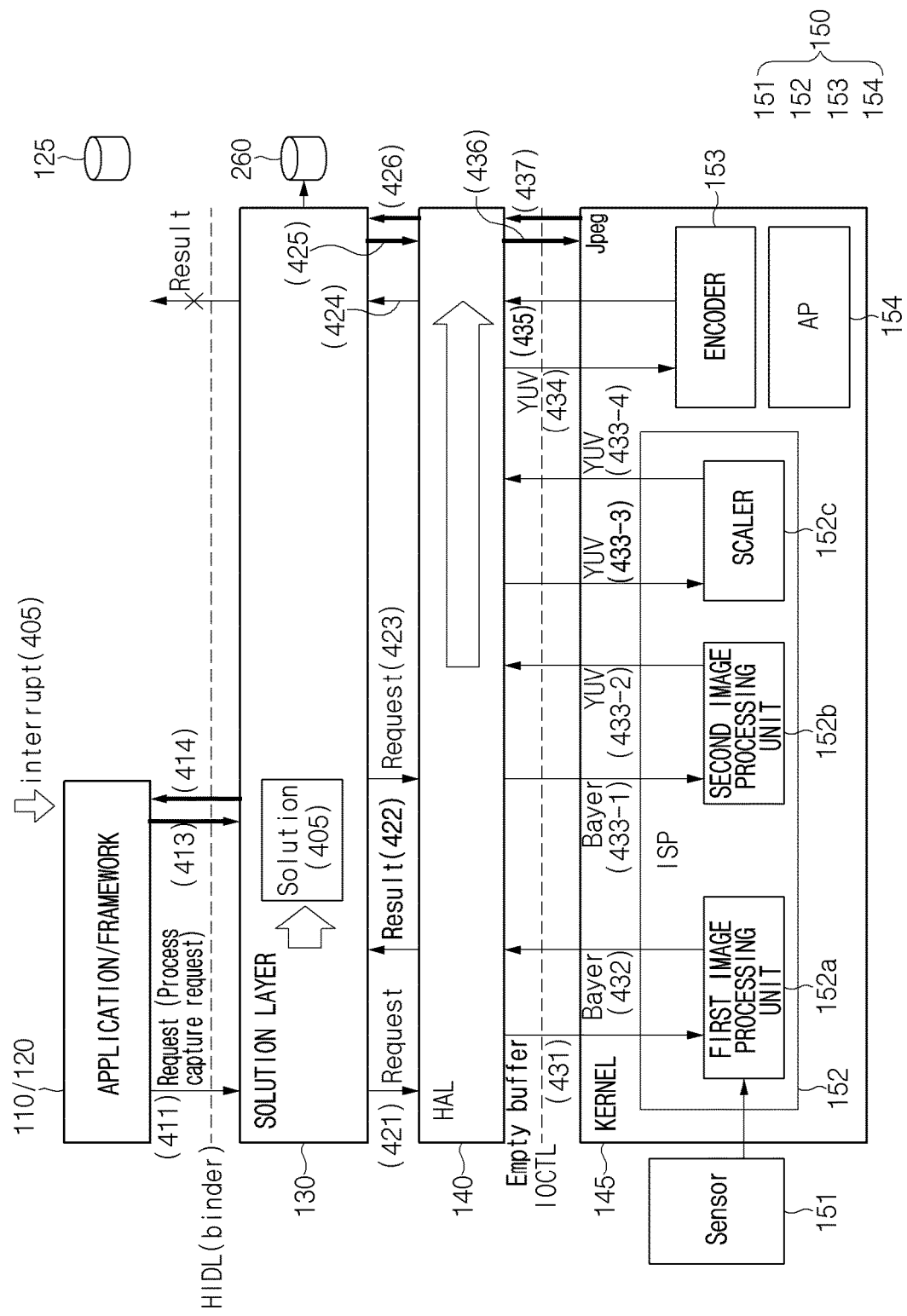
FIG. 5 is a signal flow diagram about image processing when a connection between a framework and a solution layer is disconnected by an interrupt according to an embodiment of the disclosure.

FIG. 5 is a signal flow diagram about image processing when a connection between a framework and a solution layer is disconnected by an interrupt according to an embodiment of the disclosure.

Referring to FIG. 5, an application/framework 110/120 may generate a first request signal (e.g., a process capture request (PCR)) 411 about image processing and may transmit the first request signal 411 to a solution layer 130 in a specified communication scheme (e.g., binder communication). The first request signal 411 may be generated and transmitted every frame and every capture operation.

The solution layer 130 may receive the first request signal 411 and may internally change the first request signal 411 to a new second request signal 421. The second request signal (e.g., the PCR) 421 may have the same format (or standard) as the first request signal 411. The solution layer 130 may transmit the second request signal 421 to an HAL 140.

The HAL 140 may fail to recognize whether the second request signal (e.g., the PCR) 421 is a signal delivered from the application/framework 110/120 or a signal delivered from the solution layer 130. Thus, the HAL 140 may process the second request signal (e.g., the PCR) 421, without a separate additional operation.

The HAL 140 may drive a hardware resource 150, based on the second request signal (e.g., the PCR) 421. The HAL 140 may receive the obtained image data (432) and may deliver the image data to the solution layer 130 (a first result signal 422). The solution layer 130 may apply a solution for image quality improvement using the received image data.

According to various embodiments of the disclosure, when a sudden interrupt occurs (e.g., when a call is received, when an alarm occurs, or the like) before post processing of the image data is completed in the solution layer 130, the application 110 may be ended and the framework 120 may transmit a close request signal 413 to the solution layer 130.

When receiving the close request signal 413 in a state before the post processing of the image data is completed, the solution layer 130 may transmit a return complete signal 414 corresponding to the close request signal 413 to the framework 120. The framework 120 may recognize a state where return of the hardware resource 150 is completed by means of the return complete signal 414. In a state where post processing of the image data proceeds, the solution layer 130 may fail to transmit a separate close request signal to the HAL 140. Thus, the HAL 140 may continue performing the post processing of the image data using the hardware resource 150. Even when a sudden interrupt 405 occurs because the HAL 140 is not ended until all the hardware resources 150 are used, the HAL 140 may obtain the post processed second result signal (424). When the connection with the framework 120 is disconnected by the end of the application 110, the solution layer 130 may temporarily store the second result signal 424, the image processing of which is performed, in the storage unit 260 accessible by the solution layer 130 or may transmit the second result signal 424 to a separate service communicable with the solution layer 130.

When receiving the second signal through the HAL 140 (424), the solution layer 130 may transmit the close request signal to the HAL 140. The HAL 140 may transmit a signal 436 to return the hardware resource 150 to the kernel 145 in response to the close request signal 425. When receiving a return complete response 437 from the kernel 145, the HAL 140 may transmit a return complete signal 426 to the solution layer 130. The hardware resource 150 may include the image sensor 151, the ISP 152, the encoder 153, and the application (AP) 154.

Figure 6:
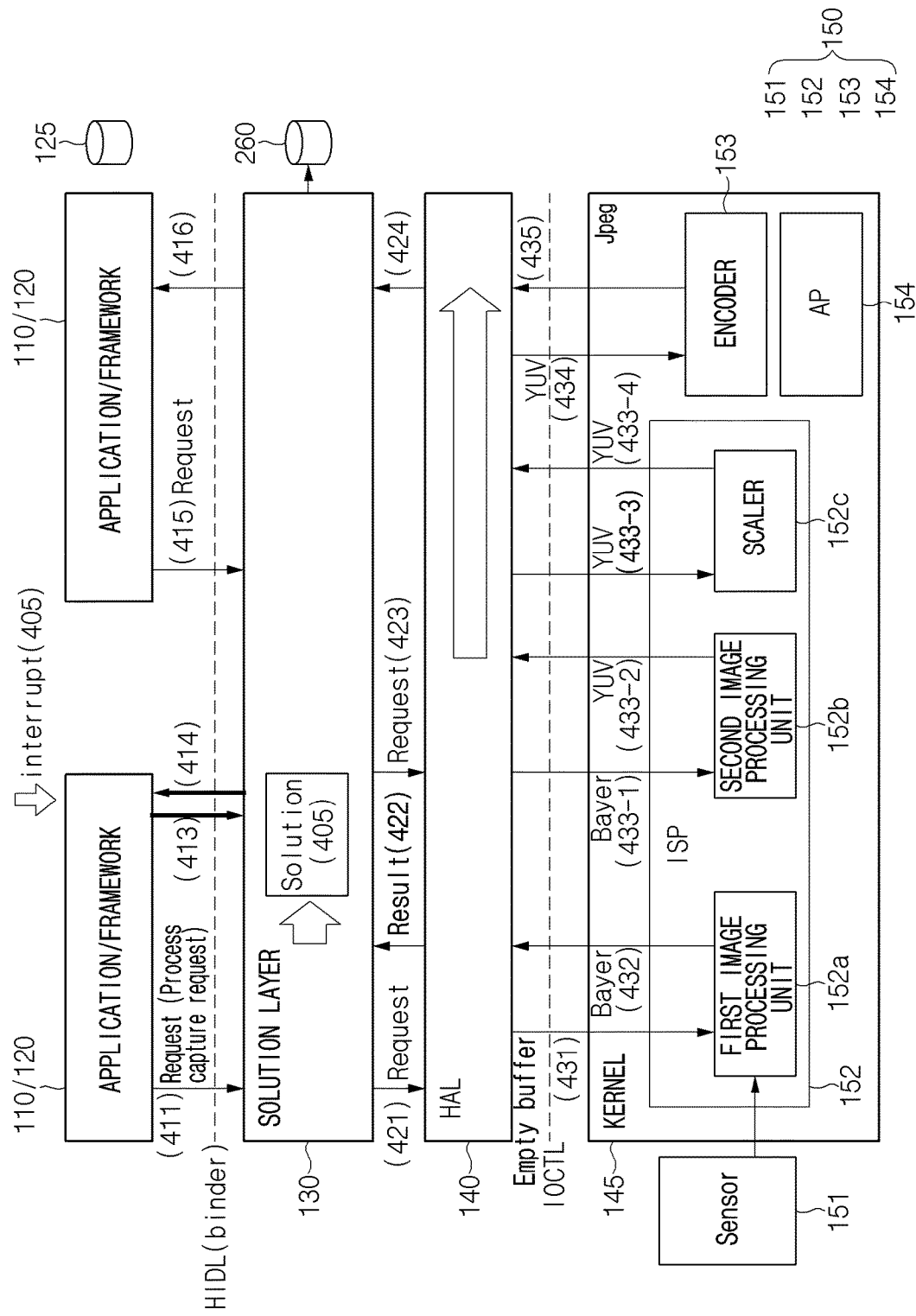
FIG. 6 is a signal flow diagram about image processing when a same application is run after an interrupt according to an embodiment of the disclosure.

FIG. 6 is a signal flow diagram about image processing when a same application is run after an interrupt according to an embodiment of the disclosure.

Referring to FIG. 6, when a sudden interrupt occurs (e.g., when a call is received, when an alarm occurs, or the like) before post processing of image data is completed in a solution layer 130, an application 110 may be ended and a framework 120 may transmit a close request signal 413 to the solution layer 130.

When receiving the close request signal 413 in a state before the post processing of the image data is completed, the solution layer 130 may transmit a return complete signal 414 corresponding to the close request signal 413 to a framework 120. The framework 120 may recognize a state where return of a hardware resource 150 is completed by means of the return complete signal 414. In a state where post processing of the image data proceeds, the solution layer 130 may fail to transmit a separate close request signal to an HAL 140. Thus, the HAL 140 may continue performing the post processing of the image data using a hardware resource 150. Even when a sudden interrupt 405 occurs because the HAL 140 is not ended until all the hardware resources 150 are used, the HAL 140 may obtain the post processed second result signal (435).

According to various embodiments of the disclosure, after the interrupt occurs (e.g., after the call is received, after the alarm occurs, or the like) (405), when the new application 110 is run, the application 110 may transmit an open request to the framework 120. The framework 120 may transmit an open request signal 415 corresponding to the open request to the solution layer 130.

Because the HAL 140 is in a state where it continues performing the image processing using the hardware resource 150, the solution layer 130 may fail to transmit a separate open request to the HAL 140 in response to the received open request signal 415. In this case, the solution layer 130 may ignore the previously received close request signal 415 and may fail to transmit a signal to return the separate hardware resource 150 even when the HAL 140 receives a second result signal 424 using the hardware resource 150. The HAL 140 may fail to need to allocate an empty buffer again and may fail to need an additional entry time to operate the image sensor 151. When the connection of the framework 120 is maintained (when the application 110 is maintained without being ended), the solution layer 130 may transmit the second result signal (e.g., JPEG image data) to the framework 120 (416).

FIG. 7 is a drawing illustrating storage of a result signal according to partition division according to an embodiment of the disclosure.

Referring to FIG. 7, according to an operating system, an application 110, a framework 120, a solution layer 130, and an HAL 140 may belong to the same partition or may belong to different partitions.

In a first partition state 701, the application 110, the framework 120, the solution layer 130, and the HAL 140 may belong to a same first partition 710. For example, all the application 110, the framework 120, the solution layer 130, and the HAL 140 may be included in a "/system" partition. In this case, each of the application 110, the framework 120, the solution layer 130, and the HAL 140 may access a first storage unit 711 included in the first partition 710. In this case, even when the application 110 is ended and the connection between the framework 120 and the solution layer 130 is disconnected, the solution layer 130 or the HAL 140 may store the post processed result signal in the first storage unit 711.

In a second partition state 702, to strengthen security, the application 110 and the framework 120 may belong to the first partition 710 and the solution layer 130 and the HAL 140 may belong to a second partition 720. For example, the application 110 and the framework 120 may be included in the "/system" partition, and the solution layer 130 and the HAL 140 may be included in a "/vendor" partition. In this case, it is impossible for the solution layer 130 and the HAL 140 to access the first storage unit 711 included in the first partition 710. In this case, when the application 110 is ended and when the connection between the framework 120 and the solution layer 130 is disconnected, it may be impossible for the solution layer 130 or the HAL 140 to store the post processed result signal in the first storage unit 711.

According to an embodiment of the disclosure, when receiving the post processed result signal from the HAL 140, the solution layer 130 may deliver the received result signal to a service which belongs to the second partition 720 and may access the first storage unit 711. The service may store the received result signal in the first storage unit 711.

According to another embodiment of the disclosure, when receiving the post processed result signal from the HAL 140, the solution layer 130 may store the received result signal in the second storage unit 722 which belongs to the second partition 720. The second storage unit 722 is accessible by a service 712 which belongs to the first partition 710. The service 712 may load the result signal stored in the second storage unit 722 to store the result signal in the first storage unit 711.

Figure 8:
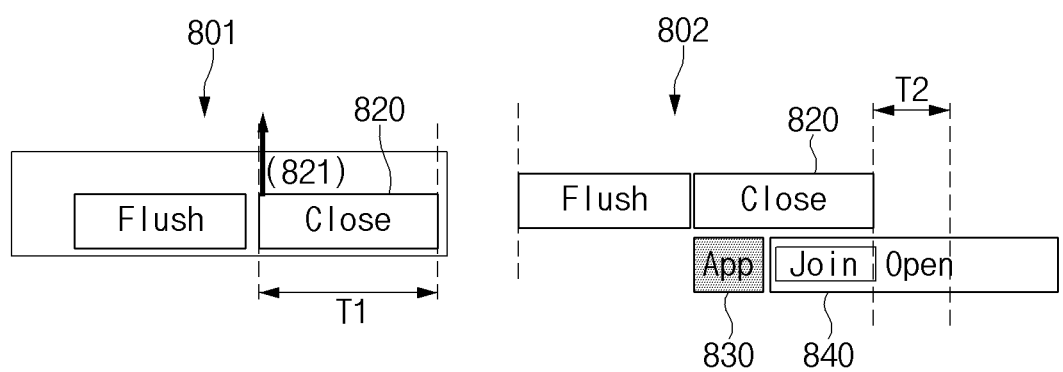
FIG. 8 illustrates time reduction in ending or switching a camera module depending on use of a solution layer according to an embodiment of the disclosure.

FIG. 8 illustrates time reduction in ending or switching a camera module depending on use of a solution layer according to an embodiment of the disclosure.

Referring to FIG. 8, in end (801) of a camera module, when receiving a close request signal during an operation of applying a solution using a hardware resource 150, a solution layer 130 may transmit a return complete signal 821 to a framework 120 at a time when a close state 820 of the camera module is started. As the return complete signal 821 is not transmitted at a time when the close state 820 is ended, a resource of an application/framework 110/120 may be quicker returned (shorten time T1). In this case, the solution layer 130 may fail to transmit a separate close request signal to an HAL 140. The HAL 140 may continue performing post processing of image data using the hardware resource 150. After the post processing of the image data is completed, the HAL 140 may return the hardware resource 150 to the background.

In switching of the camera module, in end (802) of the camera module, when receiving a camera switching request signal (e.g., switching from a front camera to a rear camera, switching from the rear camera to the front camera, or switching from a tele-camera to a wide camera) during an operation of applying a solution using the hardware resource 150, the solution layer 130 may start an application 830 switched at a time when the close state 820 of the camera module is started (shorten time T2). The application 830 may be run without waiting until the close state 820 is ended. The open state 840 of the switched camera may be quickly started. Thus, the HAL 140 may continue performing the post processing of the image data using the hardware resource 150.

Figure 9:
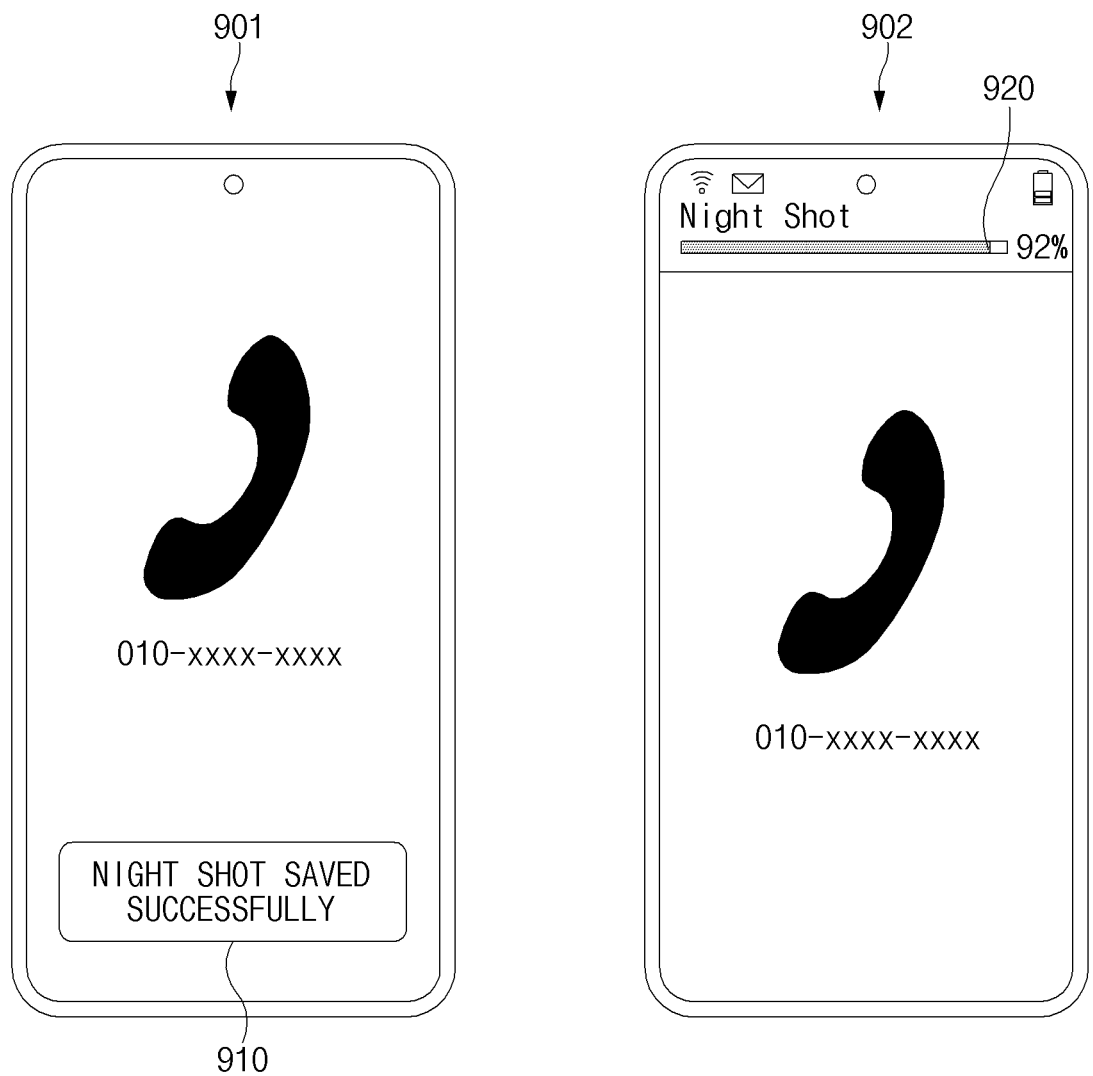
FIG. 9 illustrates a user interface according to storage of a result signal according to an embodiment of the disclosure.

FIG. 9 illustrates a user interface according to storage of a result signal according to an embodiment of the disclosure.

Referring to FIG. 9, when the connection with a framework 120 is disconnected as an application is ended because a sudden interrupt occurs (e.g., because a call is received, because an alarm occurs, or the like), a solution layer 130 may store a result of a solution for image quality improvement in the storage unit 260 or may deliver the result of the solution to another service 270.

Thereafter, when an application/framework 110/120 is run again and when a result signal (e.g., JPEG image data) stored in the storage unit 260 is moved and stored in a storage unit managed by the application/framework 110/120, related information may be displayed on a display. For example, storage information of the result signal may be displayed as a text message 910, on a first interface 901. Alternatively, the storage information of the result signal may be displayed as a status bar 920, on a second interface 902.

Figure 10:
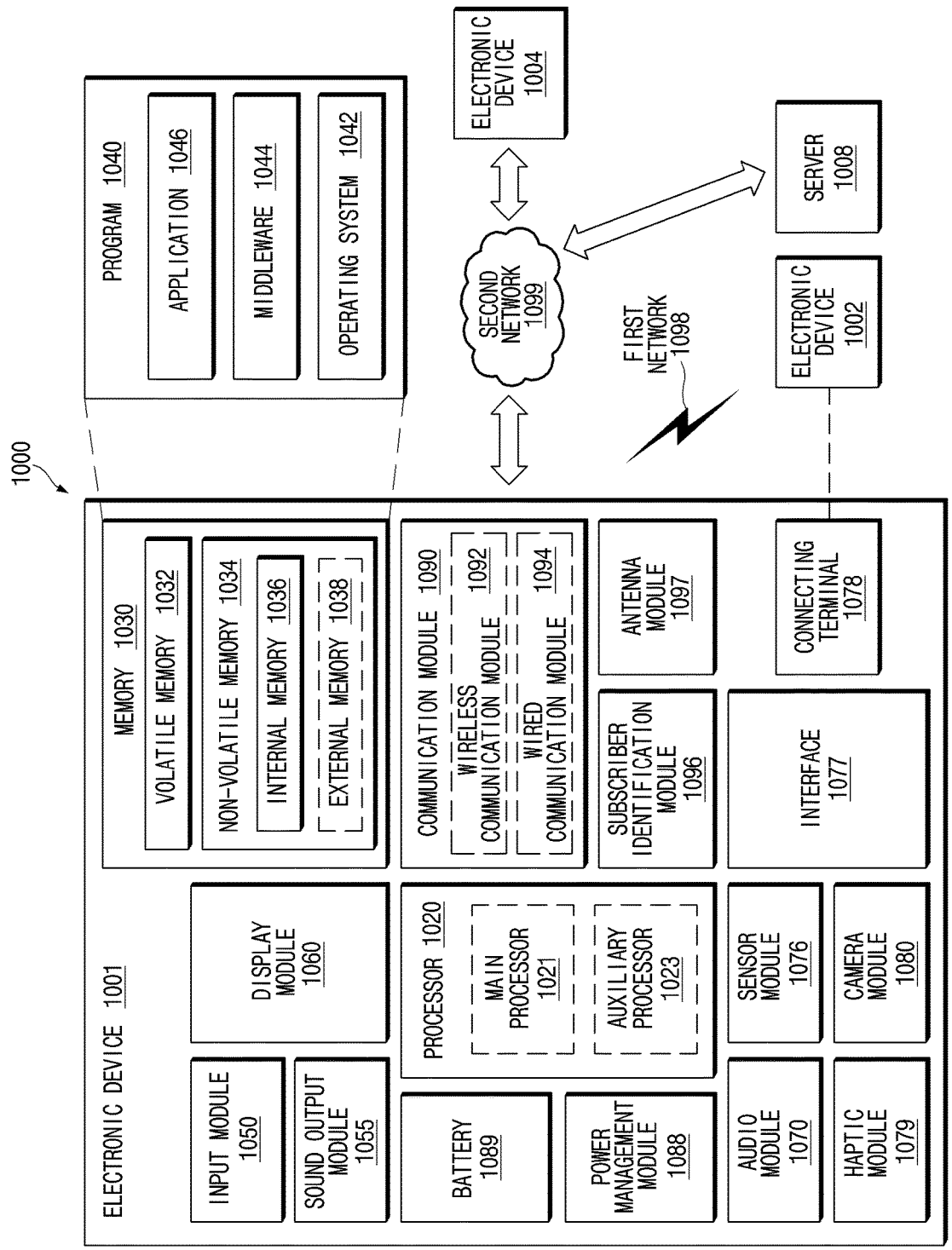
FIG. 10 is a block diagram illustrating an electronic device in a network environment according to an embodiment of the disclosure.

FIG. 10 is a block diagram illustrating an electronic device 1001 in a network environment 1000 according to an embodiment of the disclosure.

Referring to FIG. 10, electronic devices according to various embodiments disclosed in this document may be various types. The Electronic devices include, for example, portable communication devices (e.g., smartphones), computer devices (e.g., personal digital assistants (PDAs)), tablet PCs, laptop PCs (desktop PCs, workstations, or servers), portable multimedia devices (e.g., e-book readers or a Moving Picture Experts Group phase 1 or phase 2 (MPEG-1 or MPEG-2) audio layer 3 (MP3) players), portable medical devices (e.g., monitor devices of heart rate, blood sugar, blood pressure, or body temperature), cameras, or wearable devices. The wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits). In some embodiments of the disclosure, the electronic devices include, for example, at least one of televisions, digital video disc (DVD) players, audio devices, audio accessory devices (e.g., speakers, headphones, or headsets), refrigerators, air conditioners, vacuum cleaners, ovens, microwaves, washing machines, air purifiers, set-top boxes, home automation control panels, security control panels, game consoles, electronic dictionaries, electronic keys, camcorders, or electronic picture frames.

In another embodiment of the disclosure, the electronic device may include at least one of a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, a drone, an automatic teller's machine (ATM) of a financial company, a point of sales (POS) of a store, or an internet of things (for example, a bulb, a spring cooler device, a fire alarm device, a thermostat, an electric pole). The electronic device according to the embodiment of this document is not limited to the above-described devices, and, for example, as in the case of a smartphone equipped with a function of measuring personal biometric information (e.g., heart rate or blood sugar), may provide functions of a plurality of devices in a complex manner. In this document, the term user may refer to a person who uses an electronic device or a device (e.g., an artificial intelligence electronic device) using the electronic device.

The electronic device 1001 in the network environment 1000 may communicate with an external electronic device 1002 via a first network 1098 (e.g., a short-range wireless communication network), or an external electronic device 1004 or a server 1008 via a second network 1099 (e.g., a long-range wireless communication network). According to an embodiment of the disclosure, the electronic device 1001 may communicate with the external electronic device 1004 via the server 1008. According to an embodiment of the disclosure, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments of the disclosure, at least one (e.g., the display device 1060 or the camera module 1080) of the components may be omitted from the electronic device 1001, or one or more other components may be added in the electronic device 1001. In some embodiments of the disclosure, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment of the disclosure, as at least part of the data processing or computation, the processor 1020 may load a command or data received from another component (e.g., the sensor module 1076 or the communication module 1090) in a volatile memory 1032, process the command or the data stored in the volatile memory 1032, and store resulting data in a non-volatile memory 1034. According to an embodiment of the disclosure, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment of the disclosure, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034. The non-volatile memory 1034 may include an internal memory 1036 and an external memory 1038.

The program 1040 (e.g., the program module 100 of FIG. 1) may be stored in the memory 1030 as software, and may include, for example, an operating system (OS) 1042, middleware 1044, or an application (e.g., the application 110 of FIG. 1) 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment of the disclosure, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment of the disclosure, the audio module 1070 may obtain the sound via the input device 1050, or output the sound via the sound output device 1055 or a headphone of an external electronic device (e.g., an external electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment of the disclosure, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the external electronic device 1002) directly (e.g., wiredly) or wirelessly. According to an embodiment of the disclosure, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the external electronic device 1002). According to an embodiment of the disclosure, the connecting terminal 1078 may include, for example, a HDMI connector, a USB connector, an SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1079 may include, for example, a motor, a piezoelectric element, or an electric stimulator.

The camera module (e.g., a hardware resource 150 in FIG. 1) 1080 may capture a still image or moving images. According to an embodiment of the disclosure, the camera module 1080 may include one or more lenses, image sensors, image signal processors, or flashes.

The power management module 1088 may manage power supplied to the electronic device 1001. According to one embodiment of the disclosure, the power management module 1088 may be implemented as at least part of, for example, a power management integrated circuit (PMIC).

The battery 1089 may supply power to at least one component of the electronic device 1001. According to an embodiment of the disclosure, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the external electronic device 1002, the external electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment of the disclosure, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment of the disclosure, the antenna module 1097 may include an antenna including a radiating element including a conductive material or a conductive pattern formed in or on a substrate (e.g., a printed circuit board (PCB)). According to an embodiment of the disclosure, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment of the disclosure, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1001 and the external electronic device 1004 via the server 1008 coupled with the second network 1099. Each of the external electronic devices 1002 and 1004 may be a device of a same type as, or a different type, from the electronic device 1001. According to an embodiment of the disclosure, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
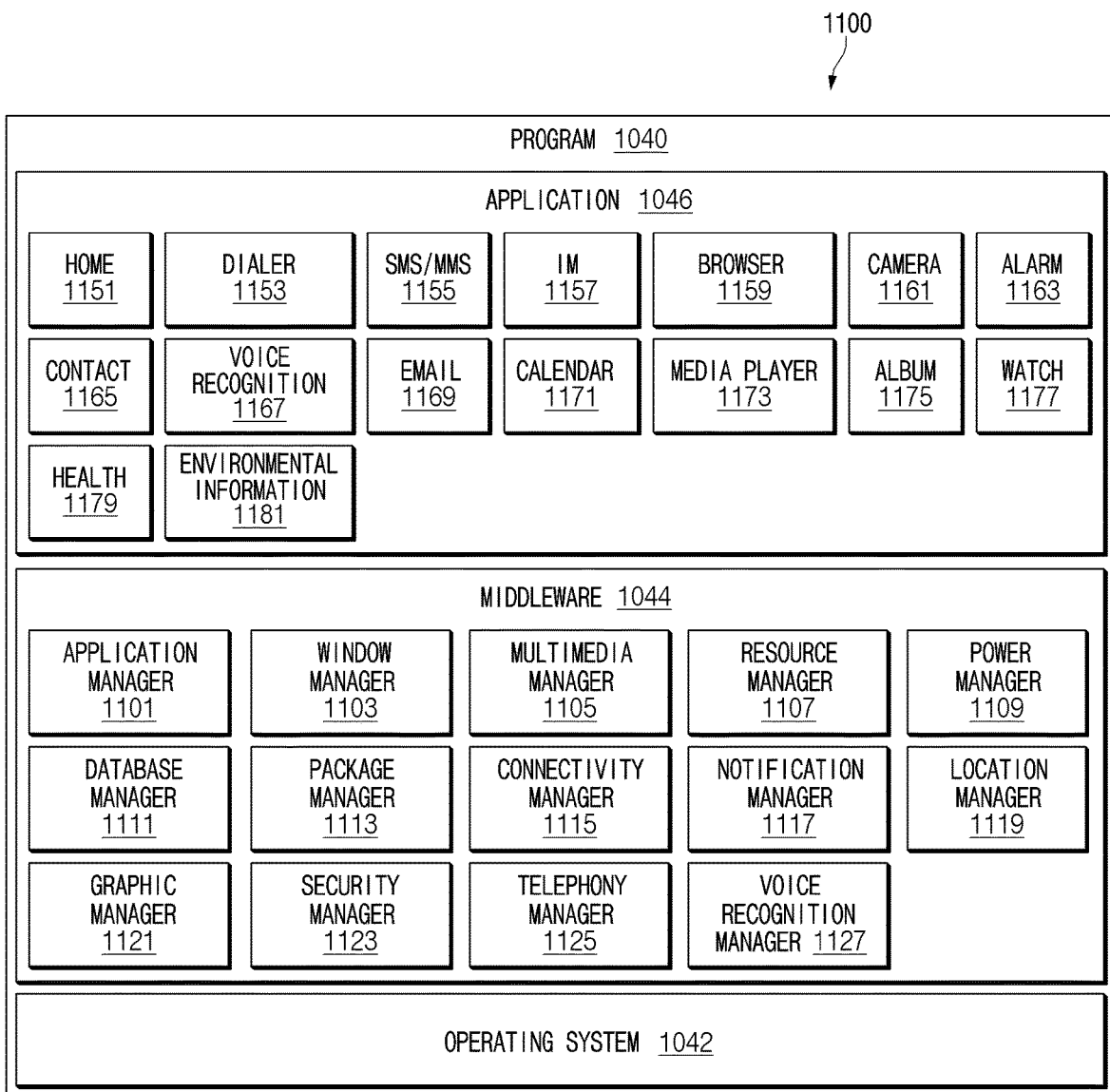
FIG. 11 is a block diagram illustrating a program according to an embodiment of the disclosure.

FIG. 11 is a block diagram 1100 illustrating a program according to an embodiment of the disclosure.

Referring to FIG. 11, the program 1040 may include an operating system (OS) 1042 to control one or more resources of the electronic device 1001, middleware 1044, or an application 1046 executable in the OS 1042. The OS 1042 may include, for example, Android™, iOS™, Windows™, Symbian™, Tizen™, or Bada™. At least part of the program 1040, for example, may be pre-loaded on the electronic device 1001 during manufacture, or may be downloaded from or updated by an external electronic device (e.g., the external electronic device 1002 or 1004, or the server 1008) during use by a user.

The OS 1042 may control management (e.g., allocating or deallocation) of one or more system resources (e.g., process, memory, or power source) of the electronic device 1001. The OS 1042, additionally or alternatively, may include one or more driver programs to drive other hardware devices of the electronic device 1001, for example, the input module 1050, the sound output module 1055, the display module 1060, the audio module 1070, the sensor module 1076, the interface 1077, the haptic module 1079, the camera module 1080, the power management module 1088, the battery 1089, the communication module 1090, the subscriber identification module 1096, or the antenna module 1097.

The middleware 1044 may provide various functions to the application 1046 such that a function or information provided from one or more resources of the electronic device 1001 may be used by the application 1046. The middleware 1044 may include, for example, an application manager 1101, a window manager 1103, a multimedia manager 1105, a resource manager 1107, a power manager 1109, a database manager 1111, a package manager 1113, a connectivity manager 1115, a notification manager 1117, a location manager 1119, a graphic manager 1121, a security manager 1123, a telephony manager 1125, or a voice recognition manager 1127.

The application manager 1101, for example, may manage the life cycle of the application 1046. The window manager 1103, for example, may manage one or more graphical user interface (GUI) resources that are used on a screen. The multimedia manager 1105, for example, may identify one or more formats to be used to play media files, and may encode or decode a corresponding one of the media files using a codec appropriate for a corresponding format selected from the one or more formats. The resource manager 1107, for example, may manage the source code of the application 1046 or a memory space of the memory 1030. The power manager 1109, for example, may manage the capacity, temperature, or power of the battery 1089, and determine or provide related information to be used for the operation of the electronic device 1001 based at least in part on corresponding information of the capacity, temperature, or power of the battery 1089. According to an embodiment of the disclosure, the power manager 1109 may interwork with a basic input/output system (BIOS) (not shown) of the electronic device 1001.

The database manager 1111, for example, may generate, search, or change a database to be used by the application 1046. The package manager 1113, for example, may manage installation or update of an application that is distributed in the form of a package file. The connectivity manager 1115, for example, may manage a wireless connection or a direct connection between the electronic device 1001 and the external electronic device. The notification manager 1117, for example, may provide a function to notify a user of an occurrence of a specified event (e.g., an incoming call, message, or alert). The location manager 1119, for example, may manage locational information on the electronic device 1001. The graphic manager 1121, for example, may manage one or more graphic effects to be offered to a user or a user interface related to the one or more graphic effects.

The security manager 1123, for example, may provide system security or user authentication. The telephony manager 1125, for example, may manage a voice call function or a video call function provided by the electronic device 1001. The voice recognition manager 1127, for example, may transmit a user's voice data to the server 1008, and receive, from the server 1008, a command corresponding to a function to be executed on the electronic device 1001 based at least in part on the voice data, or text data converted based at least in part on the voice data. According to an embodiment of the disclosure, the middleware 1144 may dynamically delete some existing components or add new components. According to an embodiment of the disclosure, at least part of the middleware 1044 may be included as part of the OS 1042 or may be implemented as another software separate from the OS 1042.

The application 1046 may include, for example, a home 1151, a dialer 1153, a short message service (SMS)/multimedia messaging service (MMS) 1155, instant message (IM) 1157, a browser 1159, a camera 1161, an alarm 1163, a contact 1165, voice recognition 1167, an email 1169, a calendar 1171, a media player 1173, an album 1175, a watch 1177, health 1179 (e.g., for measuring the degree of workout or biometric information, such as blood sugar), or environmental information 1181 (e.g., for measuring air pressure, humidity, or temperature information) application. According to an embodiment of the disclosure, the application 1046 may further include an information exchanging application (not shown) that is capable of supporting information exchange between the electronic device 1001 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 1169) of the electronic device 1001 to the external electronic device. Additionally or alternatively, the notification relay application may receive notification information from the external electronic device and provide the notification information to a user of the electronic device 1001.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

An electronic device (e.g., an electronic device 1001 of FIG. 10) according to various embodiments may include a camera module (e.g., a hardware resource 150 of FIG. 1 or a camera module 1080 of FIG. 10) for obtaining image data, a memory (e.g., the memory 1030 of FIG. 10) for storing a program module for controlling the camera module (e.g., the hardware resource 150 of FIG. 1 or the camera module 1080 of FIG. 10), and a processor (e.g., the processor 1020 of FIG. 10) electrically connected with the camera module (e.g., the hardware resource 150 of FIG. 1 or the camera module 1080 of FIG. 10) and the memory (e.g., the memory 1030 of FIG. 10). The program module may include an application (e.g., an application 110 of FIG. 1) associated with the camera module (e.g., the hardware resource 150 of FIG. 1 or the camera module 1080 of FIG. 10), a framework (e.g., a framework 120 of FIG. 1) for processing one or more requests received from the application (e.g., the application 110 of FIG. 1), a hardware interface (e.g., an HAL 140 of FIG. 1) for performing interface with the camera module (e.g., the hardware resource 150 of FIG. 1 or the camera module 1080 of FIG. 10), and a solution layer (e.g., a solution layer 130 of FIG. 1) for linking between the hardware interface (e.g., the HAL 140 of FIG. 1) and the framework (e.g., the framework 120 of FIG. 1) and performing a post processing operation of the image data using at least a part of the camera module (e.g., the hardware resource 150 of FIG. 1 or the camera module 1080 of FIG. 10).

According to various embodiments of the disclosure, the solution layer (e.g., the solution layer 130 of FIG. 1) may have a life cycle different from the application (e.g., the application 110 of FIG. 1) or the framework (e.g., the framework 120 of FIG. 1).

According to various embodiments of the disclosure, the solution layer (e.g., the solution layer 130 of FIG. 1) may identify whether the post processing operation is ended, when receiving a close request signal requesting to return the camera module (e.g., the hardware resource 150 of FIG. 1 or the camera module 1080 of FIG. 10) from the framework (e.g., the framework 120 of FIG. 1). The solution layer (e.g., the solution layer 130 of FIG. 1) may transmit a result signal by the post processing operation to the framework (e.g., the framework 120 of FIG. 1), when the post processing operation is ended. The solution layer (e.g., the solution layer 130 of FIG. 1) may ignore the close request signal, when receiving a request signal about using the camera module (e.g., the hardware resource 150 of FIG. 1 or the camera module 1080 of FIG. 10) from the framework (e.g., the framework 120 of FIG. 1), before the post processing operation is ended. The solution layer (e.g., the solution layer 130 of FIG. 1) may transmit a return complete signal corresponding to the close request signal to the framework (e.g., the framework 120 of FIG. 1), when the post processing operation is not ended. The solution layer (e.g., the solution layer 130 of FIG. 1) may transmit a signal requesting to return the camera module (e.g., the hardware resource 150 of FIG. 1 or the camera module 1080 of FIG. 10) to the hardware interface (e.g., the HAL 140 of FIG. 1), after the post processing operation is ended.

According to various embodiments of the disclosure, the memory (e.g., the memory 1030 of FIG. 10) may include a first storage unit accessible by the solution layer (e.g., the solution layer 130 of FIG. 1). The solution layer (e.g., the solution layer 130 of FIG. 1) may store a result signal of the post processing operation in the first storage unit, after the post processing operation is ended. The memory (e.g., the memory 1030 of FIG. 10) may include a second storage unit which is periodically polled by a service communicable with the framework (e.g., the framework 120 of FIG. 1). The result signal stored in the first storage unit may be stored in the second storage unit. The electronic device (e.g., the electronic device 1001 of FIG. 10) may further include a display. The processor (e.g., the processor 1020 of FIG. 10) may display a user interface associated with a stored result on the display, when the result signal is stored in the second storage unit.

According to various embodiments of the disclosure, the solution layer (e.g., the solution layer 130 of FIG. 1) may deliver a result signal of the post processing operation to a service communicable with the framework (e.g., the framework 120 of FIG. 1), after the post processing operation is ended.

According to various embodiments of the disclosure, the solution layer (e.g., the solution layer 130 of FIG. 1) may belong to a partition different from the application (e.g., the application 110 of FIG. 1) and the framework (e.g., the framework 120 of FIG. 1).

An image processing method performed in an electronic device (e.g., an electronic device 1001 of FIG. 10) according to various embodiments may include running an application (e.g., an application 110 of FIG. 1) associated with a camera module (e.g., a hardware resource 150 of FIG. 1 or a camera module 1080 of FIG. 10) of the electronic device (e.g., the electronic device 1001 of FIG. 10) and a framework (e.g., a framework 120 of FIG. 1), obtaining image data using the camera module (e.g., the hardware resource 150 of FIG. 1 or the camera module 1080 of FIG. 10), determining, by a solution layer (e.g., a solution layer 130 of FIG. 1) linking between the framework (e.g., the framework 120 of FIG. 1) and a hardware interface (e.g., an HAL 140 of FIG. 1) of the camera module (e.g., the hardware resource 150 of FIG. 1 or the camera module 1080 of FIG. 10), whether the image data needs a post processing operation using the camera module (e.g., the hardware resource 150 of FIG. 1 or the camera module 1080 of FIG. 10), and requesting, by the solution layer (e.g., the solution layer 130 of FIG. 1), the post processing operation using the camera module (e.g., the hardware resource 150 of FIG. 1 or the camera module 1080 of FIG. 10) from the hardware interface (e.g., the HAL 140 of FIG. 1), when the post processing operation is needed.

According to various embodiments of the disclosure, the image processing method may further include transmitting, by the framework (e.g., the framework 120 of FIG. 1), a request signal to return the camera module (e.g., the hardware resource 150 of FIG. 1 or the camera module 1080 of FIG. 10) to the solution layer (e.g., the solution layer 130 of FIG. 1), when an interrupt about ending the application (e.g., the application 110 of FIG. 1) occurs, transmitting, by the solution layer (e.g., the solution layer 130 of FIG. 1), a return complete signal to the framework (e.g., the framework 120 of FIG. 1), when the post processing operation is in progress, and controlling, by the solution layer (e.g., the solution layer 130 of FIG. 1), the hardware interface (e.g., the HAL 140 of FIG. 1) such that the post processing operation is continuously maintained.

According to various embodiments of the disclosure, the application (e.g., the application 110 of FIG. 1) may have a life cycle of an open state, a stream configuration state, a flush state, and a close state. The transmitting of the return complete signal may include transmitting, by the solution layer (e.g., the solution layer 130 of FIG. 1), the return complete signal to the framework (e.g., the framework 120 of FIG. 1) at a time when the close state is started.

According to various embodiments of the disclosure, the image processing method may further include requesting to return the camera module (e.g., the hardware resource 150 of FIG. 1 or the camera module 1080 of FIG. 10) from the hardware interface (e.g., the HAL 140 of FIG. 1), when the post processing operation is completed.

According to various embodiments of the disclosure, the image processing method may further include storing a result signal according to the post processing in a storage unit accessible by the solution layer (e.g., the solution layer 130 of FIG. 1), when the post processing operation is completed.

According to various embodiments of the disclosure, the image processing method may further include providing a result signal according to the post processing to a service communicable with the framework (e.g., the framework 120 of FIG. 1), when the post processing operation is completed.

According to various embodiments of the disclosure, the image processing method may further include ignoring, by the solution layer (e.g., the solution layer 130 of FIG. 1), the request signal, when the application (e.g., the application 110 of FIG. 1) and the framework (e.g., the framework 120 of FIG. 1) are run again before the post processing operation is completed.

According to various embodiments of the disclosure, the solution layer (e.g., the solution layer 130 of FIG. 1) may belong to a partition different from the application (e.g., the application 110 of FIG. 1) and the framework (e.g., the framework 120 of FIG. 1).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiment of the disclosure s, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera module configured to obtain image data;
a memory configured to store a program module and control the camera module; and
a processor electrically connected with the camera module and the memory,
wherein the program module includes:
an application associated with the camera module,
a framework configured to process one or more requests received from the application,
a solution layer configured to provide an interface with the framework and perform a post processing operation of the image data using at least a part of the camera module, and
a hardware abstraction layer (HAL) configured to provide the solution layer with an interface to the camera module, and control operations of the camera module based on instructions received from the solution layer.

2. The electronic device of claim 1, wherein the solution layer has a life cycle different from the application or the framework.

3. The electronic device of claim 1, wherein the solution layer identifies whether the post processing operation is ended, when receiving a close request signal requesting to return the camera module from the framework.

4. The electronic device of claim 3, wherein the solution layer transmits a result signal by the post processing operation to the framework, when the post processing operation is ended.

5. The electronic device of claim 3, wherein the solution layer ignores the close request signal, when receiving a request signal about using the camera module from the framework, before the post processing operation is ended.

6. The electronic device of claim 3, wherein the solution layer transmits a return complete signal corresponding to the close request signal to the framework, when the post processing operation is not ended.

7. The electronic device of claim 6, wherein the solution layer transmits a signal requesting to return the camera module to the HAL, after the post processing operation is ended.

8. The electronic device of claim 6,
wherein the memory includes a first storage unit accessible by the solution layer, and
wherein the solution layer stores a result signal of the post processing operation in the first storage unit, after the post processing operation is ended.

9. The electronic device of claim 8,
wherein the memory includes a second storage unit being periodically polled by a service communicable with the framework, and
wherein the result signal stored in the first storage unit is stored in the second storage unit.

10. The electronic device of claim 9, further comprising:
a display,
wherein the processor displays a user interface associated with a stored result on the display, when the result signal is stored in the second storage unit.

11. The electronic device of claim 6, wherein the solution layer delivers a result signal of the post processing operation to a service communicable with the framework, after the post processing operation is ended.

12. The electronic device of claim 1, wherein the solution layer belongs to a partition different from the application and the framework.

13. An image processing method performed in an electronic device, the method comprising:
running an application associated with a camera module of the electronic device and a framework;
obtaining image data using the camera module;
determining, by a solution layer linking between the framework and a hardware abstraction layer (HAL) of the camera module, whether the image data needs a post processing operation using the camera module; and
requesting, by the solution layer, the post processing operation using the camera module from the HAL, when the post processing operation is needed.

14. The method of claim 13, further comprising:
transmitting, by the framework, a request signal to return the camera module to the solution layer, when an interrupt about ending the application occurs;
transmitting, by the solution layer, a return complete signal to the framework, when the post processing operation is in progress; and
controlling, by the solution layer, the HAL such that the post processing operation is continuously maintained.

15. The method of claim 14,
wherein the application has a life cycle of an open state, a stream configuration state, a flush state, and a close state, and
wherein the transmitting of the return complete signal includes:
transmitting, by the solution layer, the return complete signal to the framework at a time when the close state is started.

* * * * *